United States Patent [19]

Itezono

[11] Patent Number: 4,710,951
[45] Date of Patent: Dec. 1, 1987

[54] FACSIMILE SYSTEM

[75] Inventor: Toshiyuki Itezono, Tokyo, Japan

[73] Assignee: Oki Electric Industry Co., Ltd., Tokyo, Japan

[21] Appl. No.: 748,044

[22] Filed: Jun. 24, 1985

[30] Foreign Application Priority Data

Jun. 25, 1984 [JP] Japan ................... 59-129276

[51] Int. Cl.$^4$ .................................. H04N 1/32
[52] U.S. Cl. ............................ 379/100; 358/257
[58] Field of Search ............... 179/2 D P; 358/257, 358/256; 379/100

[56] References Cited

U.S. PATENT DOCUMENTS

| | | | |
|---|---|---|---|
| 3,943,300 | 3/1976 | Stevenson | 179/2 DP |
| 4,113,992 | 9/1978 | Gorham et al. | 179/90 B |
| 4,317,136 | 2/1982 | Keyt et al. | 358/256 |
| 4,524,393 | 6/1985 | Ohzeki | 358/257 |
| 4,532,379 | 7/1985 | Tsukioka | 358/257 |
| 4,581,656 | 4/1986 | Wada | 358/257 |
| 4,586,086 | 4/1986 | Ohzeki | 358/257 |
| 4,622,592 | 11/1986 | Ikehata et al. | 379/100 X |
| 4,642,697 | 2/1987 | Wada | 379/100 X |
| 4,646,160 | 2/1987 | Iizuka et al. | 379/100 X |

FOREIGN PATENT DOCUMENTS

| | | | |
|---|---|---|---|
| 0166405 | 1/1986 | European Pat. Off. | 358/257 |
| 0154848 | 9/1984 | Japan | 358/257 |
| 0046164 | 3/1985 | Japan | 358/257 |
| 2141904 | 1/1985 | United Kingdom | 179/2 DP |

Primary Examiner—Gene Z. Rubinson
Assistant Examiner—Connors
Attorney, Agent, or Firm—Wenderoth, Lind & Ponack

[57] ABSTRACT

A facsimile system includes a memory for storing a plurality of full dialing numbers at predetermined addresses of a plurality of abbreviated dialing numbers, a delivery unit for delivering to a telephone circuit one of the full dialing numbers which is read out of the memory in response to the designation of an address corresponding to one of the abbreviated dialing numbers, an input unit for issuing transmission command information and address information for the abbreviated dialing number, a first control unit for controlling the facsimile communication operation so as to detect the end of a facsimile reception, and a second control unit for controlling the readout, from the memory, of the full dialing number specified by the address information of the abbreviated dialing number from the input unit and for also controlling the delivery of the full dialing number from the delivery unit. When the address information for the abbreviated dialing number and the transmission command information are received during a facsimile reception, the second control unit controls the deliver unit to delivery the full dialing number corresponding to the abbreviated dialing number in response to a signal indicative of the end of the facsimile reception and issued from the first control unit.

1 Claim, 5 Drawing Figures

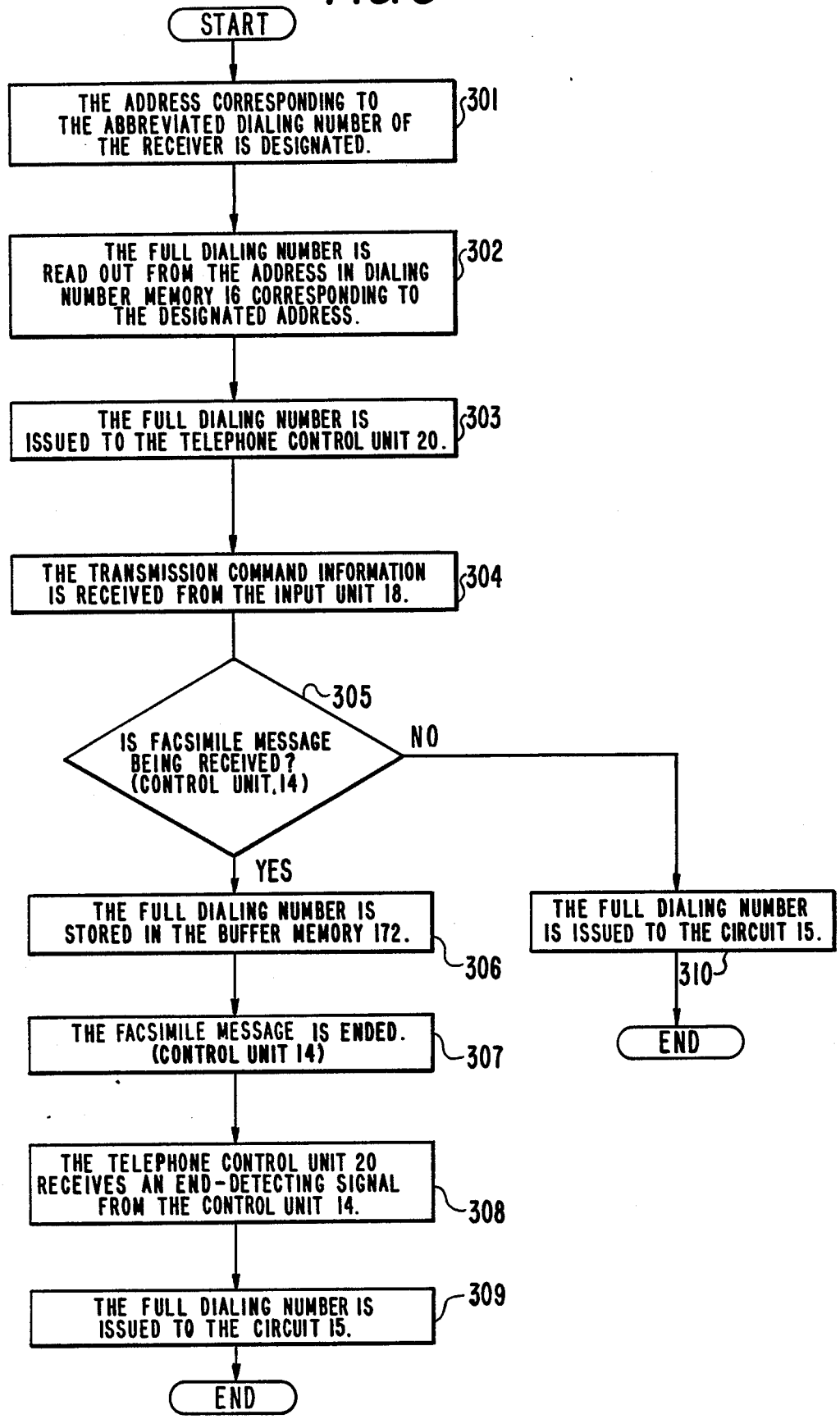

FACSIMILE SYSTEM

BACKGROUND OF THE INVENTION

1. Field of the Invention

The present invention relates to a facsimile system for connection to a telephone circuit.

2. Description of the Related Art

Conventional facsimile systems are generally classified into the following groups: (1) Facsimile systems which prohibit the operator from taking any other actions on the facsimile systems while they are receiving messages; (2) Full-duplex facsimile system in which a transmitter and a receiver are completely separated from each other for simultanous message transmission and reception; and (3) Facsimile systems in which a received signal is temporarily stored in a memory having a large storage capacity such as a hard disk, and the stored message is read out when desired to produce a hard copy thereof (see, for example, Japanese Laid-Open Patent Publication No. 58-139562).

The facsimile systems in group (1) have a problem in that when the facsimile system is receiving a long message, an operator who wishes to send a message through the facsimile system immediately after the reception is finished must attend the system until the reception is over since the operator does not know when the reception will be completed. Although the facsimile systems in class (2) are free from the foregoing drawback, the cost of the required equipment is high because the system requires two telephone circuits for reception and transmission, and also requires a transmitter and a receiver which are completely independent of each other. The facsimile system in the category (3) allows the operator to send a message directly without going through an internal memory while a received message stored in the internal memory is being printed on a sheet of paper. This facsimile system is also capable of storing a message to be transmitted in the internal memory, if it has an available memory area, even while an incoming message is being stored into the internal memory, so that the outgoing message can automatically be delivered to the circuit immediately after the reception of the incoming message has been completed. Therefore, the operator who wants to transmit the message is not required to attend the facsimile system until the message reception or printing is over. However, the cost of the system is very high because of the mass-storage memory required.

SUMMARY OF THE INVENTION

It is an object of the present invention to provide a facsimile system which allows the operator to specify a receiver while an incoming message is being received so that an outgoing message can automatically be transmitted to the specified receiver immediately after the reception of the incoming message is completed, thereby eliminating the time in which the operator desiring to send the outgoing message is required to attend the system until the incoming message has been received, and which does not need to employ a memory with a large storage capacity.

To achieve the above object, a facsimile system according to the present invention includes a memory means for storing a plurality of full dialing numbers at the predetermined addresses of a plurality of abbreviated dialing numbers, a delivery means for delivering to a telephone circuit one of the full dialing numbers which is read out of the memory means in response to the designation of an address corresponding to one of the abbreviated dialing numbers, an input means for issuing transmission command information and address information for the abbreviated dialing number, a modem, a means for reading original sheets, a means for printing received data, a first control means for controlling the facsimile communication operation, the reading operation of the reading means, the printing operation of the printing means, and further having the functions of detecting an end of a facsimile reception and outputting an end-detection signal after detecting the end of a facsimile reception, and a second control means for controlling the readout, from the memory means, of the full dialing number specified by the address information of the abbreviated dialing number from the input means and also for controlling the delivery of the full dialing number from the delivery means, the second control means being operable such that when the address information for the abbreviated dialing number and the transmission command information are received during a facsimile reception, the second control means controls the delivery means to deliver the full dialing number corresponding to the abbreviated dialing number in response to a signal indicative of the end of the facsimile reception issued from the first control means.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3 is a flowchart showing the steps of delivering the full dialing number.

DESCRIPTION OF THE PREFERRED EMBODIMENT

Figure 1:
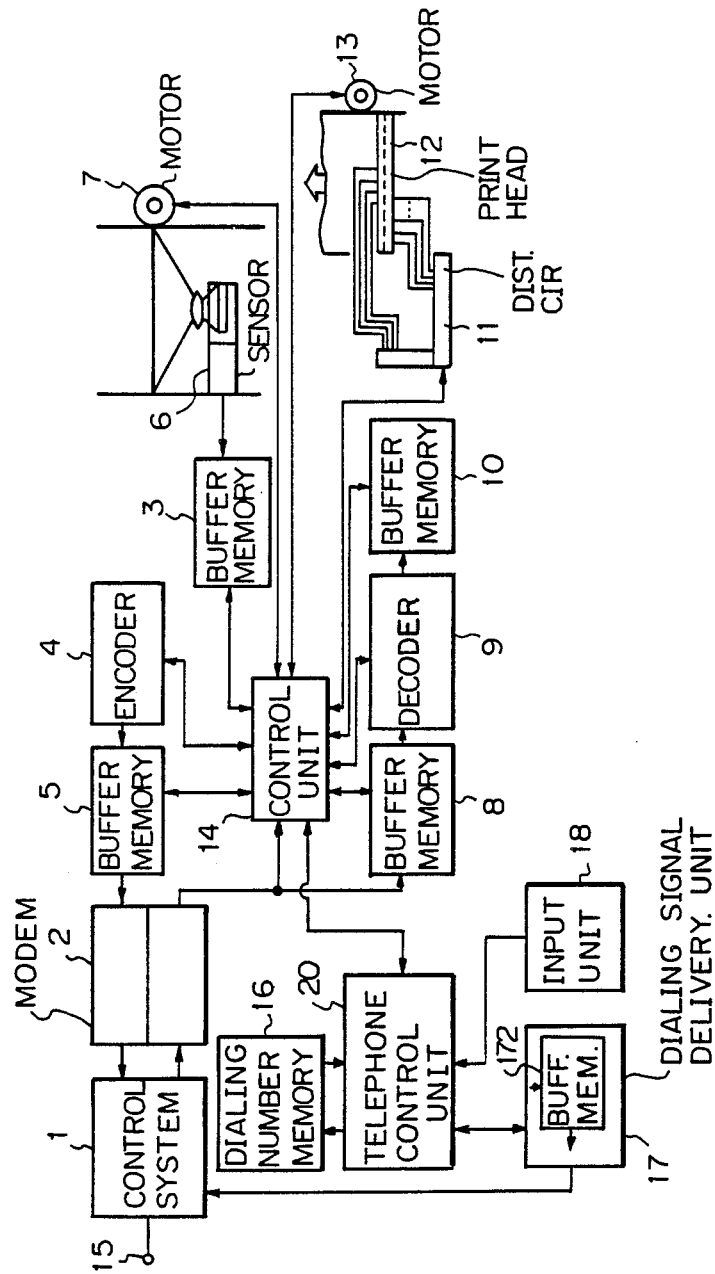
FIG. 1 is a block diagram of a facsimile system according to the present invention.

As shown in FIG. 1, a facsimile system according to the present invention has a control system 1 for controlling an exchange network, a modem 2, a buffer memory 3 having a sufficient capacity for storing several image lines scanned, an encoder 4 for encoding image signals, a buffer memory 5 for storing signals to be transmitted, a reader unit comprising an image sensor and light source 6, and a stepping motor 7 for intermittently feeding an original sheet. The facsimile system also includes a buffer memory 8 for storing a reception signal, a decoder 9 for decoding signals received, a buffer memory 10 for storing several lines of image signals received, a printer unit comprising a print head driver and image distribution circuit 11, a print head 12, a stepping motor 13 for intermittenty feeding a sheet of print a print head 12, paper, and a control unit and power supply 14. The control unit is capable of controlling the facsimile communication operation, the reading operation of the reader unit and the printing operation of the printer unit, and further having the functions of detecting an end of a facsimile reception and outputting an end-detection signal after detecting the end of a facsimile reception. Denoted at 15 is a telephone circuit. The facsimile system also has a dialing number memory 16 for storing a plurality of full dialing numbers at the prescribed addresses of a plurality of abbreviated dialing numbers, a dialing signal delivery unit 17 for delivering to the telephone circuit one of the full dialing numbers which is read out of the memory 16 upon designation of the address corresponding to one of the abbreviated dialing numbers, the dialing signal delivery unit 17 having a buffer memory 172 for temporarily storing one full dialing number, an input unit 18 for issuing transmission command information and address information for the abbreviated dialing numbers in response to the operation of a keyboard (not shown), and a telephone control unit 20 for reading, from the dialing number memory 16, the full dialing number specified by the address information of the abbreviated dialing number entered from the input unit 18. The telephone control unit 20 operates such that when an address of an abbreviated dialing number and a transmission command are received during a facsimile reception, the telephone control unit 20 controls the dialing signal delivery unit 17 to deliver the full dialing number, corresponding to the abbreviated dialing number stored in the buffer memory 172, in response to a signal indicative of the end of the facsimile reception, said signal being issued by the control unit 14.

The abbreviated dialing numbers can be registered under the control of the telephone control unit 20 by specifying, through the input unit 18, addresses in the dialing number memory 16 which are determined in a corresponding relationship to addresses in the dialing number memory 16, i.e., the abbreviated dialing numbers, and storing the full dialing numbers into the specified addresses through the input unit 18.

In a facsimile transmission, at first, an operator sets the original sheets on the reader unit and inputs the abbreviated dialing number of the receiver to the input unit 18. Then, the abbreviated dialing number of the receiver is transmitted from the input unit 18 to the telephone control unit 20, which then reads the corresponding full dialing number from the address in the dialing number memory 16 which corresponds to the issued abbreviated dialing number, and is then fed to the dialing signal delivery unit 17.

At that time, when no facsimile message is being received, the telephone control unit 20 immediately transmits the full dialing number to the telephone circuit 15, and then the facsimile data of the original sheets which are read out by the reader unit are transmitted to the receiver via the modem 3 and the control system 1 under the control of the control unit 14. When a facsimile message is being received, the full dialing number read out of the dialing number memory 16 is stored in the buffer memory 172. The control unit 14 monitors the communication procedure (prescribed in the recommendation T30 of the CCITT) in the telephone circuit 15, and detects the end of a reception when there is an exchange of data indicating the end of the reception as prescribed by the recommendation T30. More specifically, in the G3 mode, the transmitter sends an EOP signal (End of Procedure signal), receives an MCF signal (Message of Confirmation signal) from the receiver, and then sends a DCN signal (Disconnect signal). Thereafter, the transmitter cuts off the circuit, and the receiver detects the end of transmission by receiving the DCN. Alternatively, in the G2 mode, the receiver receives an EOM signal (End of Message signal), sends an MCF signal and a GI signal (Group Identity signal) to the transmitter, and receives a GC signal (Group Command signal) from the transmitter. When 30 to 40 seconds have elapsed without receiving the GI signal, the procedure is judged as being completed. Therefore, if original sheets having data to be transmitted are set and the abbreviated dialing number of a receiver and a transmission command are transmitted by the input unit 18 to the telephone control unit 20 while an incomming messsage is being received, when the control unit 14 detects the end of the reception and the telephone control unit 20 receives an end-detection signal from the control unit 14, then the full dialing number of the receiver which has been read out of the dialing number memory 16 and stored in the buffer memory 172 will be read out of the buffer memory 172 and delivered to the telephone circuit 15 under the control of the telephone control unit 20. Then, the facsimile data of the original sheets, which are read out by the reader unit, are transmitted to the receiver via the modem 3 and the control system 1 under the control of the control unit 14.

According to the present invention, therefore, even when the facsimile system is in a reception mode and incapable of sending an outgoing message right away, the operator can set the original sheets having data to be sent and enter the abbreviated dialing number of the receiver and a transmission command to thereby make the facsimile system ready for transmission. After the incoming message has been received, the outgoing message is automatically transmitted to the desired receiver. As a result, the operator is not required to spend a wasteful amount time which would otherwise be required by attending the facsimile system until the completion of the reception of the incoming message, which the operator is unaware of in most cases.

Figure 2:
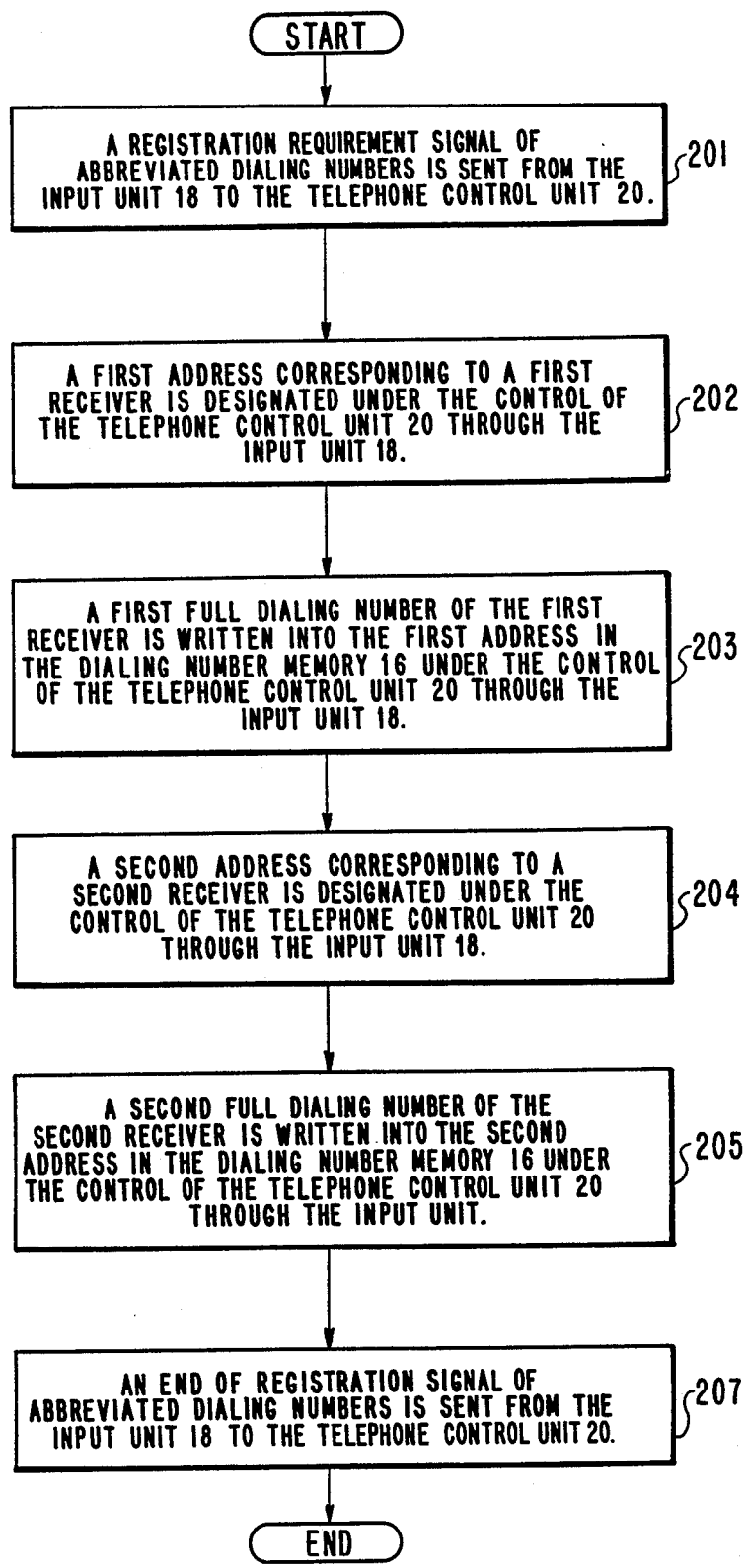
FIG. 2 is a flowchart showing the steps of registering the abbreviated dialing number.

FIG. 2 and FIG. 3 are self-explanatory flowcharts respectively showing the steps effected by the system of FIG. 1 in registering the abbreviated dialing number and delivering the full dialing number.

Figure 4A:
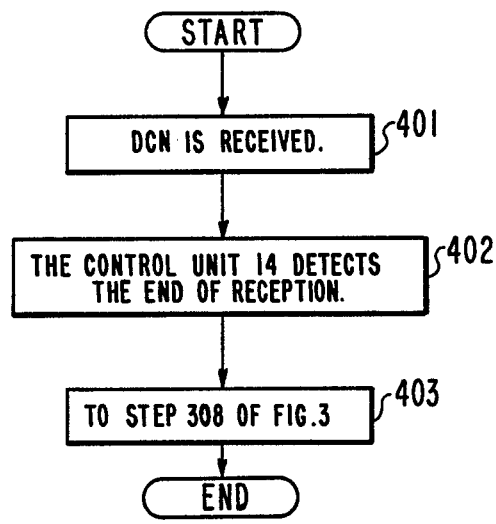
FIG. 4(a) is a flowchart showing the detailed steps of the step 307 as shown in FIG. 3.
Figure 4B:
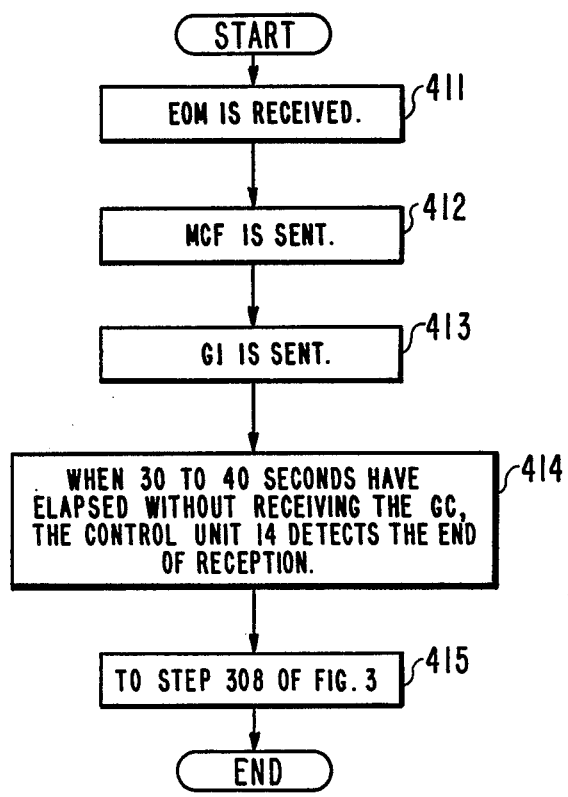
FIG. 4(b) is an alternative flowchart showing the detailed step of the step 307 as shown in FIG. 3.

FIG. 4(a) and FIG. 4(b) are two flowcharts illustrating two alternative arrangements of the detailed steps of operation of step 307 of FIG. 3, that is, the operation when the facsimile message has ended.

In view of the self-explanatory nature of the aforementioned flowcharts and their ease of understanding by one skilled in the art, a detailed discussion thereof has been omitted for the sake of brevity.

Although a certain preferred embodiment has been shown and described, it should be understood that many changes and modifications may be made therein without departing from the scope of the appended claim.

What is claimed is:

1. A facsimile system comprising:
   (a) a network control unit for controlling an exchange network;
   (b) an input means for inputting transmission command information, dialing number and address information for an abbreviated dialing number;
   (c) a memory means for storing a plurality of full dialing numbers at predetermined addresses which each correspond to a plurality of abbreviated dialing numbers;
   (d) a buffer memory for temporarily storing a telephone number to be transmitted, said telephone number being read out from said memory means upon a designation of an address corresponding to a specified abbreviated dialing number;

(e) a delivery means for delivering a dialing number stored in said buffer memory to a telephone circuit via said network control unit;

(f) a modem for modulating data suitable for transmission over a telephone circuit and for demodulating data received from said telephone circuit;

(g) a means for reading original sheets;

(h) a means for printing the received data;

(i) a first control means for controlling a facsimile communication operation of said facsimile system and a reading operation of said reading means and a printing operation of said printing means, and for detecting an end of a facsimile reception and for outputting an end-detection signal thereafter; and (j) a second control means for controlling said memory means and buffer memory, and for controlling said delivery means so as to deliver a dialing number stored in said buffer memory to said telephone circuit immediately during an idle state of the system, or after receiving said end-detection signal from said first control means after a facsimile reception;

wherein when address information for said abbreviated dialing number and said transmission command information are received during a facsimile reception, said second control means controls said delivery means so as to deliver the full dialing number stored in said buffer memory to said telephone circuit in response to said end-detection signal from said first control means.

* * * * *